US012565221B2

(12) United States Patent
Brown et al.

(10) Patent No.: US 12,565,221 B2
(45) Date of Patent: Mar. 3, 2026

(54) DIGITAL INSPECTION OF HEALTH OF AUTONOMOUS VEHICLES

(71) Applicant: TuSimple, Inc., San Diego, CA (US)

(72) Inventors: Robert Patrick Brown, San Diego, CA (US); Jason Robert Lau, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 396 days.

(21) Appl. No.: 18/171,222

(22) Filed: Feb. 17, 2023

(65) Prior Publication Data

US 2023/0192105 A1     Jun. 22, 2023

Related U.S. Application Data

(63) Continuation of application No. 17/021,631, filed on Sep. 15, 2020, now Pat. No. 11,603,108.

(51) Int. Cl.
| | |
|---|---|
| *B60W 50/02* | (2012.01) |
| *B60W 30/06* | (2006.01) |
| *B60W 60/00* | (2020.01) |
| *G07C 5/00* | (2006.01) |

(52) U.S. Cl.
CPC ............ *B60W 50/02* (2013.01); *B60W 30/06* (2013.01); *B60W 60/001* (2020.02); *G07C 5/006* (2013.01); *G07C 5/008* (2013.01); *B60W 2530/10* (2013.01); *B60W 2556/10* (2020.02); *B60W 2556/45* (2020.02)

(58) Field of Classification Search
CPC .... B60W 50/02; B60W 30/06; B60W 60/001; B60W 2530/10; B60W 2556/10; B60W 2556/45; B60W 50/045; B60W 2050/046; B60W 2756/10; G07C 5/006; G07C 5/008; G06Q 10/00
USPC ......................................................... 701/26
See application file for complete search history.

(56) References Cited

U.S. PATENT DOCUMENTS

| | | | |
|---|---|---|---|
| 8,391,829 B2 * | 3/2013 | Das ........................... | H04W 4/44 |
| | | | 455/418 |
| 2016/0086391 A1 * | 3/2016 | Ricci ........................ | G07C 5/08 |
| | | | 701/29.3 |
| 2016/0231746 A1 | 8/2016 | Hazelton et al. | |
| 2017/0169369 A1 * | 6/2017 | Garnavi ................ | G06T 7/0002 |
| 2018/0009377 A1 * | 1/2018 | Troutman ............. | B60R 16/023 |
| 2018/0081374 A1 * | 3/2018 | Nimchuk ......... | G06Q 10/08355 |
| 2019/0016341 A1 * | 1/2019 | Nelson ................. | G08G 1/0133 |
| 2019/0268675 A1 * | 8/2019 | Troutman ............... | H04L 69/18 |
| 2019/0364492 A1 * | 11/2019 | Azizi ................. | H04W 52/0264 |
| 2020/0017114 A1 * | 1/2020 | Santoni ............. | B60W 50/0205 |

(Continued)

OTHER PUBLICATIONS

"Motion Driver Guide," PrePass Safety Alliance, Version 4.1, Apr. 17, 2019.

(Continued)

*Primary Examiner* — Tyler D Paige
(74) *Attorney, Agent, or Firm* — Perkins Coie LLP

(57) ABSTRACT

Techniques are described for an autonomous vehicle to provide the autonomous vehicle's health-related information, identification information, and/or inspection information to a device that may be used by law enforcement or a government agency or a third-party so that the autonomous vehicle can comply with government regulations and can continue to operate on the road.

20 Claims, 3 Drawing Sheets

(56) References Cited

U.S. PATENT DOCUMENTS

| | | | | |
|---|---|---|---|---|
| 2020/0156627 | A1* | 5/2020 | Wieschemann | G05D 1/0088 |
| 2020/0202292 | A1* | 6/2020 | Doig | H04W 4/029 |
| 2021/0183186 | A1* | 6/2021 | Patnaik | B60W 60/0025 |
| 2022/0008098 | A1 | 1/2022 | Finger et al. | |

OTHER PUBLICATIONS

"Understanding the North American Standard Inspection Program," Commercial Vehicle Safety Alliance.
"All Inspection Levels," Commercial Vehicle Safety Alliance, available at https://www.cvsa.org/inspections/inspections/all-inspection-levels/.
European Patent Office, Extended European search report for EP 21195247.8, Mailing Date: Feb. 17, 2022, 8 pages with English translation.

* cited by examiner

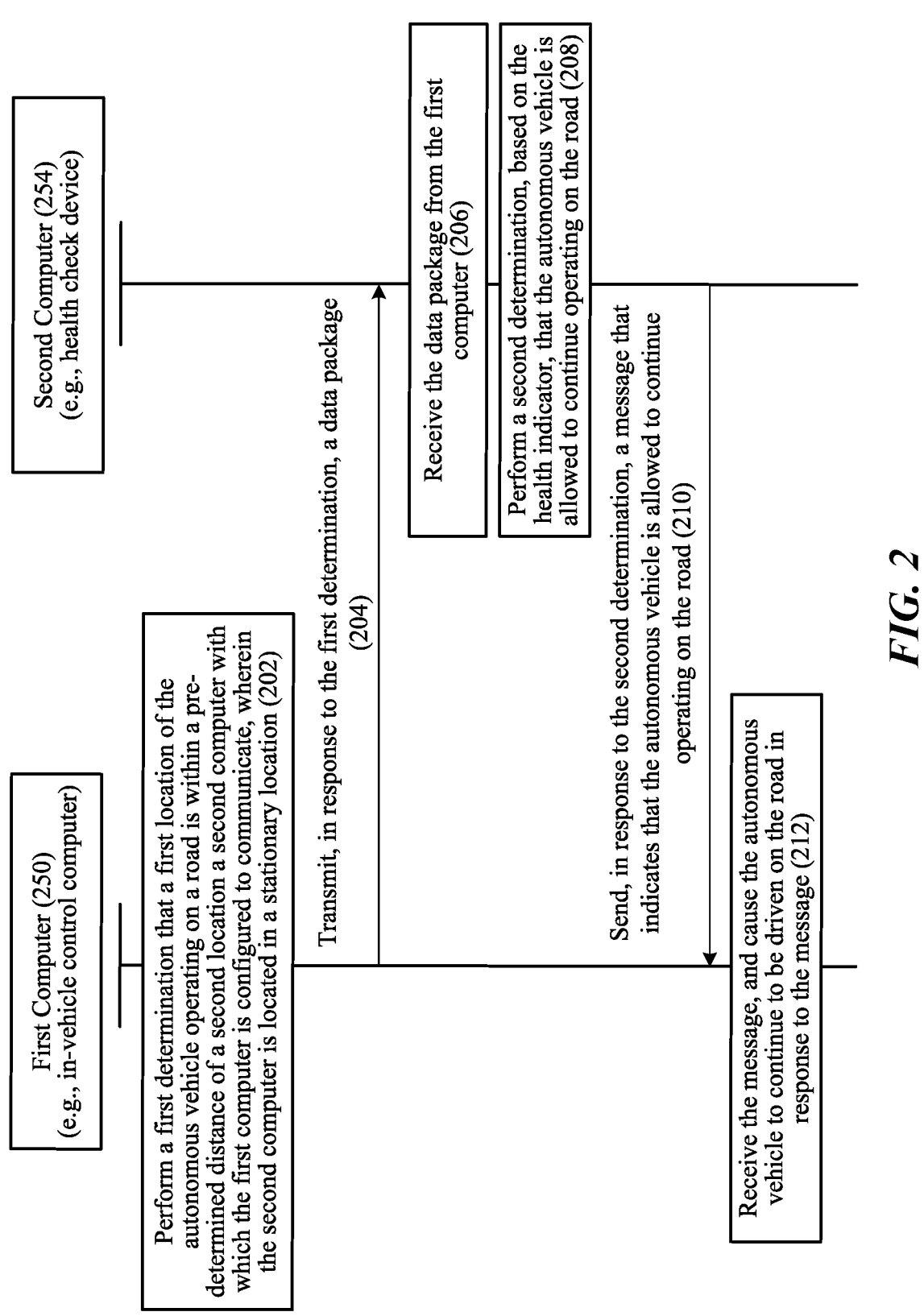

Second Computer (254)
(e.g., health check device)

First Computer (250)
(e.g., in-vehicle control computer)

Perform a first determination that a first location of the autonomous vehicle operating on a road is within a pre-determined distance of a second location a second computer with which the first computer is configured to communicate, wherein the second computer is located in a stationary location (202)

Transmit, in response to the first determination, a data package (204)

Receive the data package from the first computer (206)

Perform a second determination, based on the health indicator, that the autonomous vehicle is allowed to continue operating on the road (208)

Send, in response to the second determination, a message that indicates that the autonomous vehicle is allowed to continue operating on the road (210)

Receive the message, and cause the autonomous vehicle to continue to be driven on the road in response to the message (212)

*FIG. 2*

DIGITAL INSPECTION OF HEALTH OF AUTONOMOUS VEHICLES

CROSS-REFERENCE TO RELATED APPLICATIONS

This patent application is a continuation of U.S. patent application Ser. No. 17/021,631, filed on Sep. 15, 2020, which is incorporated herein by reference in its entirety for all purposes.

TECHNICAL FIELD

This document relates to systems, apparatus, and methods to perform inspection of health of autonomous vehicles by law enforcement or other regulatory agencies.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, an autonomous vehicle may be driven by itself, without a driver, using an autonomous vehicle control systems and navigation technology. Autonomous vehicles may be subject to various governmental regulations for the autonomous vehicles to be allowed to operate on roads.

SUMMARY

When an autonomous vehicle is driven on a road, the autonomous vehicle may be subject to various governmental regulations that may be setup to determine whether the autonomous vehicles can safely operate on a road. This patent document describes systems, apparatus, and methods for an autonomous vehicle to provide health-related information, identification information, and/or inspection information of the autonomous vehicle to a device (e.g., server or computer) that may be used by law enforcement or a government agency or a third-party so that the autonomous vehicle can comply with government regulations and can continue to operate on the road.

In some embodiments, an in-vehicle control computer located in the autonomous vehicle can send a data package comprising health-related information, identification information, and/or inspection information of the autonomous vehicle to the device that may be operated by the law enforcement or the government agency or the third-party. The in-vehicle control computer can send the data package when the autonomous vehicle is within a certain distance of a location of the device and as the autonomous vehicle is being operated on the road. Based on the information included in the data package, the device can send a message to the in-vehicle control computer that can indicate whether the autonomous vehicle is approved to continue to operate on the road.

In an example embodiment, a system for autonomous driving operation, comprises an autonomous vehicle comprising a first computer and a second computer located in a stationary location (e.g., a building). The first computer includes a first processor configured to perform a first determination that a first location of the autonomous vehicle operating on a road is within a pre-determined distance of a second location a second computer with which the first computer is configured to communicate, wherein the second computer is located in a stationary location; and transmit, in response to the first determination, a data package comprising an health indicator that indicates an overall health of the autonomous vehicle. The second computer comprising a second processor configured to: receive the data package from the first computer; perform a second determination, based on the health indicator, that the autonomous vehicle is allowed to continue operating on the road; and send, to the first computer in response to the second determination, a message that indicates that the autonomous vehicle is allowed to continue operating on the road. The first computer comprising the first processor is configured to: receive the message; and cause the autonomous vehicle to continue to be driven on the road in response to the message.

In some embodiments, the health indicator includes one of two values or one of two descriptions that indicate whether the overall health autonomous vehicle is good. In some embodiments, the second determination is performed based on one value or one description of the health indicator indicating that the overall health of the autonomous vehicle is good. In some embodiments, the first processor of the first computer is further configured to: store the second location of a second computer in a list comprising a plurality of devices, wherein the plurality of devices comprises the second computer, and wherein each device in the list is associated with a location.

In some embodiments, the second processor of the second computer is further configured to: perform a third determination that the autonomous vehicle is to stop or park based on the health indicator indicating that the overall health of the autonomous vehicle is not good; send, to the first computer and in response to the third determination, a second message that indicates to the autonomous vehicle to stop or park in a safe area; and wherein the first processor of the first computer is further configured to: cause the autonomous vehicle to stop or park in response to receiving the second message.

In some embodiments, the data package comprises a date and timestamp that indicates when sensors onboard the autonomous vehicle were last calibrated. In some embodiments, after the first determination and before the data package is transmitted the first processor of the first computer is further configured to: generate the data package comprising the health indicator by determining that the health indicator is associated with a category or a privilege level that is allowed to be included in the data package.

In another example embodiment, a first computer is located in an autonomous vehicle, the first computer comprising a processor, configured to implement a method comprising: perform a first determination that a first location of the autonomous vehicle operating on a road is within a pre-determined distance of a second location a second computer with which the first computer is configured to communicate, wherein the second computer is located in a stationary location; transmit, to the second computer and in response to the first determination, a data package comprising an health indicator that indicates an overall health of the autonomous vehicle; receive, from second computer located in a stationary location outside of the autonomous vehicle, a message that indicates the autonomous vehicle is allowed to continue operating on the road, wherein the message is sent based on the health indicator; and cause the autonomous vehicle to continue to be driven on the road in response to the message.

In some embodiments, the data package comprises the health indicator of the autonomous vehicle, an identification information that identify the autonomous vehicle, and an inspection information related to inspection performed on the autonomous vehicle. In some embodiments, the identification information comprises a department of transportation (DOT) number that uniquely identifies the autonomous vehicle, a weight of the autonomous vehicle, and a contact information of a person associated with the autonomous vehicle. In some embodiments, the weight of the autonomous vehicle includes a weight of goods being transported by the autonomous vehicle. In some embodiments, the inspection information comprises a date when an inspection was last performed on the autonomous vehicle. In some embodiments, the date includes a year and a calendar quarter when the inspection was last performed on the autonomous vehicle.

In some embodiments, the first processor of the first computer is further configured to: store privileged or confidential data that includes content of goods being transported by the autonomous vehicle, wherein the privileged or confidential data are associated with a category or a privilege level that indicates that the privileged or confidential data is disallowed from being included in the data package. In some embodiments, the privilege level includes a password protected privilege level for which a password is required to access the privileged or confidential data.

In some embodiments, the privileged or confidential data further includes navigation data of the autonomous vehicle and a maintenance history that describes maintenance performed on the autonomous vehicle over time. In some embodiments, the privileged or confidential information further includes a log of a speed of the autonomous vehicle over time and one or more prior accident related data involving with the autonomous vehicle. In some embodiments, the autonomous vehicle is operated on the road at Society of Automotive Engineers (SAE) Automation Level 4 or SAE Automation Level 5 in which the autonomous vehicle is operated on the road without a human driver. In some embodiments, the data package is transmitted by the first computer in the autonomous vehicle operating at the SAE Automation Level 5 or the SAE Automation Level 5 without an input received via either a graphical user interface of the first computer or an input device of the first computer to trigger transmission of the data package.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 2 shows a flow diagram for an autonomous vehicle to operate on a road based on providing a data package comprising health-related information, identification information, and/or inspection information.

DETAILED DESCRIPTION

Developments in autonomous driving technology have led to a development of semi-trailer truck that can be autonomously driven to deliver goods to a destination. When an autonomous semi-trailer truck is driven to its destination, the autonomous semi-trailer truck can be subject to government regulations that may be setup to determine whether the autonomous semi-trailer truck can safely operate on a road.

In some embodiments, an in-vehicle control computer located in the autonomous semi-trailer truck can send a data package comprising health-related information, identification information, and/or inspection information to a device (e.g., server or computer) that may be used by law enforcement, government agency, or a third-party. In various embodiments, a data package may comprise one or more data packets which may have a header plus payload format. In some embodiments, a data package pay be in the form of an XML file. In some embodiments, the data package may comprise data bits that are packaged together according to one of the various formats described in the present document. As further described in this patent document, the health-related information can provide information about the overall health of the autonomous semi-trailer truck, the identification information may provide information identify the driver and/or the semi-trailer truck, and inspection information may provide information about when and what type of inspections were performed on the autonomous semi-trailer truck.

For ease of reference, this patent document refers to the device that receives the data package from the autonomous semi-trailer truck as a health-check device. The in-vehicle control computer may store the locations of the health-check devices that may be located at various locations in a geographical state or country. Thus, the in-vehicle control computer can determine when to send the data package to the health-check devices based on a location of the autonomous semi-trailer truck being within a pre-determined distance of a location of a health-check device.

When the health-check device receives the data package from an autonomous semi-trailer truck, the contents of the data package can be accessed by personnel associated with law enforcement, government agency, or a third-party via an application. Furthermore, the health-check device can determine whether a health of the autonomous semi-trailer truck is good based on the content of the data package. When the health-check device determines that the health of the autonomous semi-trailer truck is good, then the health-check device can send a message indicating to the autonomous vehicle to continue to operate on the road. When the health-check device determines that the health of the autonomous semi-trailer truck is not good, then the health-check device can send a message that triggers the autonomous vehicle to safely park or stop the autonomous vehicle.

Figure 1A:
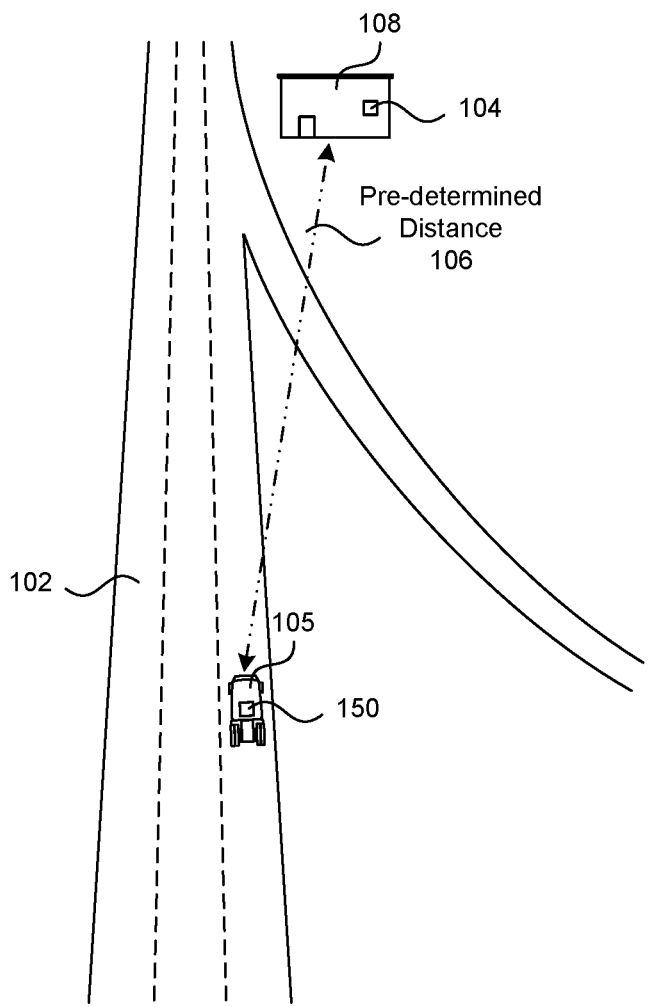
FIG. 1A shows an example scenario where an autonomous vehicle provides a data package to a health-check device and can receive a message from the health-check device to either continue to operate the vehicle or to park or stop the vehicle in a safe area.

FIG. 1A shows an example scenario where an autonomous vehicle provides a data package to a health-check device and can receive a message from the health-check device to either continue to operate the vehicle or to park or stop the vehicle in a safe area. FIG. 1A shows a bird-eye view of an autonomous vehicle 105 that is driven on a road 102 and is within a pre-determined distance 106 of a location where a health-check device 104 is located. The health-check device 104 may be a computer or server that may be physically located in a building 108 (e.g., a weight scale structure) that may be close to the road 102. The health-check device 104 may be a computer or a server that may include or may be in communication with a wireless transceiver. The wireless transceiver associated with the health-check device 104 can receive a data package that is wirelessly sent by the in-vehicle control computer 150 in the autonomous vehicle 105. Based on the contents of the data packet, a health check module of the health-check device 104 can send a message to the autonomous vehicle 105 to indicate to the autonomous vehicle 105 whether to continue to drive on the road 102 or to stop/park in a safe area.

The autonomous vehicle 105 may be a semi-trailer truck in which an in-vehicle control computer 150 may be located. The in-vehicle control computer 150 includes a health module (shown as 165 in FIG. 1B) that can perform operations to communicate with the health-check device 104 when the autonomous vehicle 105 is operating (e.g., driven on the road 102) within a pre-determined distance of a health-check device 104. The in-vehicle control computer 150 can store a list of locations of the health-check devices that may be located at various locations in a geographical state or country. The health module can determine whether the autonomous vehicle 105 is within a pre-determined distance of a health-check device by obtaining the location of the autonomous vehicle 105 from a global positioning system (GPS) device located on or in the autonomous vehicle 105 and by determining whether the location of the autonomous vehicle 105 is within a pre-determined distance of a location of a health-check device obtained from the stored list of locations of health-check devices. When the health module determines that a location of the autonomous vehicle 105 is within a pre-determined distance 106 of a location of the health-check device 104, the health module can generate and send to the health-check device 104 a data package comprising any one or more of health-related information, identification information, and inspection information. The various devices in the autonomous vehicle 105 are further described in FIG. 1B.

The data packet can include health-related information that can provide information about the overall health of the autonomous vehicle 105. In an example embodiment, the information about the overall health in the data package may include a binary health indicator (e.g., "good" or "bad", or "red" or "green") that indicates whether the overall health of an autonomous driving system (ADS) of the autonomous vehicle 105 is good or bad. In an example implementation, the binary overall health indicator can be determined from ADS health check diagnostic that is performed by the health module. In an example implementation, the ADS health check diagnostic can be performed by the health module to obtain the binary overall health indicator of the autonomous vehicle 105 by aggregating the health information provided by one or more important devices (e.g., engine, brakes, steering, transmission etc.) or sensors (e.g., camera, LiDAR, RADAR, etc.) located in the autonomous vehicle 105.

The health-check device 104 may include a health check module that can determine whether the information provided in the data package indicates that the autonomous vehicle 105 can safely operate on the road 102. The health check module can perform at least the following operations: (1) receive the data package comprising the health-related information as the autonomous vehicle 105 is driven on the road 102; (2) determine whether the autonomous vehicle 105 can be driven on the road 102 using the binary overall health indicator in the data packet; and (3) send a message to indicate to the autonomous vehicle 105 whether to continue to drive on the road 102 or to stop/park in a safe area. In an example implementation, if the health check module receives a "good" overall health indicator in the data package, then the health check module sends a message indicating to the autonomous vehicle 105 to continue to drive on the road 102, and if the health check module receives a "bad" overall health indicator, then the health check module sends a message indicating to the autonomous vehicle 105 to stop or park in a safe area. Thus, one of the technical advantages of providing in the data package a simple binary indication of the overall health of the autonomous vehicle 105 is that the health-check device 104 can quickly and without extensive computation determine whether the autonomous vehicle 105 is in an acceptable condition to operate on the road 102.

In some embodiments, the health-related information can include information (e.g., date and timestamp) that indicates a last time when the sensors onboard the autonomous vehicle 105 were calibrated. Thus, for example, the health-related information can include one or more timestamps associated with a calibration of one or more sensors onboard the autonomous vehicle 105. In some embodiments, the health module of the in-vehicle control computer 150 can perform calibration operation on the sensors onboard the autonomous vehicle 105 at a pre-determined interval (e.g., every time the autonomous vehicle 105 starts, every third time the autonomous vehicle 105 starts, once a month, etc.). The calibration operation may allow the health module to determine whether one or more sensors are measuring or outputting defective sensor data.

As shown in FIG. 1A, in some scenarios, the autonomous vehicle 105 may be driving on a road 102 when the health module sends the data package to the health-check device 104. In such scenarios, the health check module of the health-check device 104 is expected to quickly provide to the autonomous vehicle 105 a message that indicates either that the autonomous vehicle 105 is allowed to continue driving on the road 102 or that the autonomous vehicle 105 is instructed to stop or park in a safe area. Thus, another technical advantage of the binary overall health indicator is that it can enable the health-check device to quickly, and without much computation, send a message to the autonomous vehicle 105 that can instruct the autonomous vehicle 105 whether to continue to drive on the road 102.

The data packet can include identification information that may provide information to identify the driver and/or the semi-trailer truck. The identification information may include a destination address to which the autonomous vehicle 105 is headed, a starting address from which the autonomous vehicle 105 departed, a department of transportation (DOT) number that uniquely identifies the autonomous vehicle 105, a weight of the autonomous vehicle 105, a vehicle identification number (VIN) of the autonomous vehicle 105, a name of a carrier or owner that operates the autonomous vehicle 105, a license plate number of the autonomous vehicle 105, an identification (ID) of the carrier or owner (e.g., an ID number), a permit, and/or a contact information (e.g., phone number of a person responsible for the autonomous vehicle 105).

The weight of the autonomous vehicle 105 may include a trailer weight that may be determined using weight sensors located in the trailer unit (or rear portion) of the autonomous vehicle 105 that carries the goods. The trailer weight may be calculated using inertial sensors (e.g., Intertial Measurement Units IMUs). In some embodiments, the weight may include past weight information that can show a history of the loads carried by the autonomous vehicle 105.

Providing a contact information in the identification information is a beneficial feature at least because, in some scenarios, the autonomous vehicle 105 may not include a human driver. In such scenarios, a law enforcement personnel or a third-party can contact a person responsible for the autonomous vehicle 105 where the person may control the autonomous vehicle 105 from a control center located outside of the autonomous vehicle 105.

The data packet can include inspection information. The inspection information may include what type of inspection/inspections were performed on the autonomous semi-trailer truck and when each inspection was performed. In some embodiments, the inspection information may include a date when a maintenance was last performed on the autonomous vehicle 105. In some embodiments, the inspection information may include one or more dates of one or more inspections. In some embodiments, the inspection information may include a Commercial Vehicle Safety Alliance (CVSA) decal information that indicates (e.g., via a bar code) the year and calendar quarter in which the inspection was performed.

In some embodiments, the pre-determined distance within which the autonomous vehicle 105 is to transmit the data package may be determined based on a reception range of the wireless transceiver associated with the health-check device 104. For example, if the health-check device 104 is associated with a wireless transceiver that can receive data transmission within a 1000 meter range, then the pre-determined distance may be set to 900 or 1000 meters. In some embodiments, the pre-determined distance may vary between health-check devices located at different locations (e.g., in different geographical states). In such embodiments, the list of locations of health-check devices may include with each location of a health-check device, a pre-determined distance for that health-check device. In an example implementation, the list of locations of health-check devices may include a first group of health-check devices located in one state (e.g., California) that may have wireless transceivers that receive data within a 1500 meter range and a second group of health-check devices located in another state (e.g., Utah) that may have wireless transceivers that receive data within a 1000 meter range. In this example implementation, the list of locations of health-check devices may include the pre-determined distances for the various health-check device at the various locations.

In some embodiments, the health module can send the data package by automatically determining, without a human involvement, that the autonomous vehicle 105 is within the pre-determined distance of the health-check device 104. Such a technical feature is advantageous at least because the autonomous vehicle 105 may be operated at Society of Automotive Engineers (SAE) Automation Level 4 or 5 in which the autonomous vehicle 105 is operated without a human driver being physically present in the autonomous vehicle 105. In some embodiments, the health module does not prompt a human driver via a graphical user interface (GUI) of a display associated with the in-vehicle control computer 150 to request whether the data packet is to be sent to the health-check device 104. Thus, in such embodiments, the data package is transmitted by the health module without receiving an input via the GUI of the display or via an input device (e.g., keyboard or button) of the in-vehicle control computer 150.

The in-vehicle control computer may store additional information that may be proprietary and/or confidential so that such additional information can be protected from inadvertent transmission in the data package. The proprietary and/or confidential information may include navigation routing data (e.g., a navigation route being taken from a starting address to a destination), maintenance history (e.g., schedule of tire rotations, oil changes, etc.), content of goods being transported (e.g., identification of what goods are being transported), a log or history of speed data of the autonomous vehicle 105 over time, and/or a log or history of one or more prior accident data involving the autonomous vehicle 105. Such additional information may be considered proprietary (e.g., maintenance schedules) or confidential (e.g., content of goods), or both. Thus, in some embodiments, a partitioning technique may be employed by allowing the health module to use certain information (e.g., health-related information, identification information, and/or inspection information) to generate and/or transmit the data package while disallowing the health module to use certain additional information (e.g., proprietary and/or confidential information) to generate and/or transmit via the data package.

In an example implementation, the in-vehicle control computer 150 may include a database that may store information in different categories. The categories may include, for example, health category, identification category, inspection category, and confidential category. The database can store data associated with "health-related information" (e.g., the overall health indicator), "identification information" (e.g., VIN number), "inspection information" (e.g., last inspection date), and "proprietary and/or confidential information" (e.g., routing information) as described in this patent document. Data associated with the "health-related information" can be marked as "health category" in the database, the data associated with associated with the "identification information" can be marked as "identification category" in the database, the data associated with the "inspection information" can be marked as "inspection category" in the database, and the data associated with the "proprietary and/or confidential information" can be marked as "confidential category" in the database. Thus, in this example implementation, the health module is only allowed to access and/or include in the data package any one or more of health category, identification category, and inspection category. The health module can be disallowed from accessing and/or including in the data package the data marked as "confidential category" in the database.

In another example implementation, the in-vehicle control computer 150 may include a database that can assign different levels of privileges to the data. The different levels of privileges can indicate different levels of access to the health module when generating and/or transmitting the data package for the health-check devices. For example, one level of privilege may be "open access" and another level of privilege may be "password protected access." In an example implementation, the data associated with the "health-related information," "identification information," and "inspection information" can be associated with "open access" and the "proprietary and/or confidential information" can be associated with a "password protected access." When a data is marked with or assigned with "password protected access" label, the in-vehicle control computer 150 may require a person to input a password to allow the person to access such password protected data. Thus, before the health module generates the data package, the health module can first determine whether the data is associated with an "open access" privilege. When the health module determines that a data is associated with an "open access" privilege," the health module can include the data associated with such a privilege in the data package. In some embodiments, the health module can be disallowed from accessing and/or including in the data package the data marked as "password protected access."

Figure 1B:
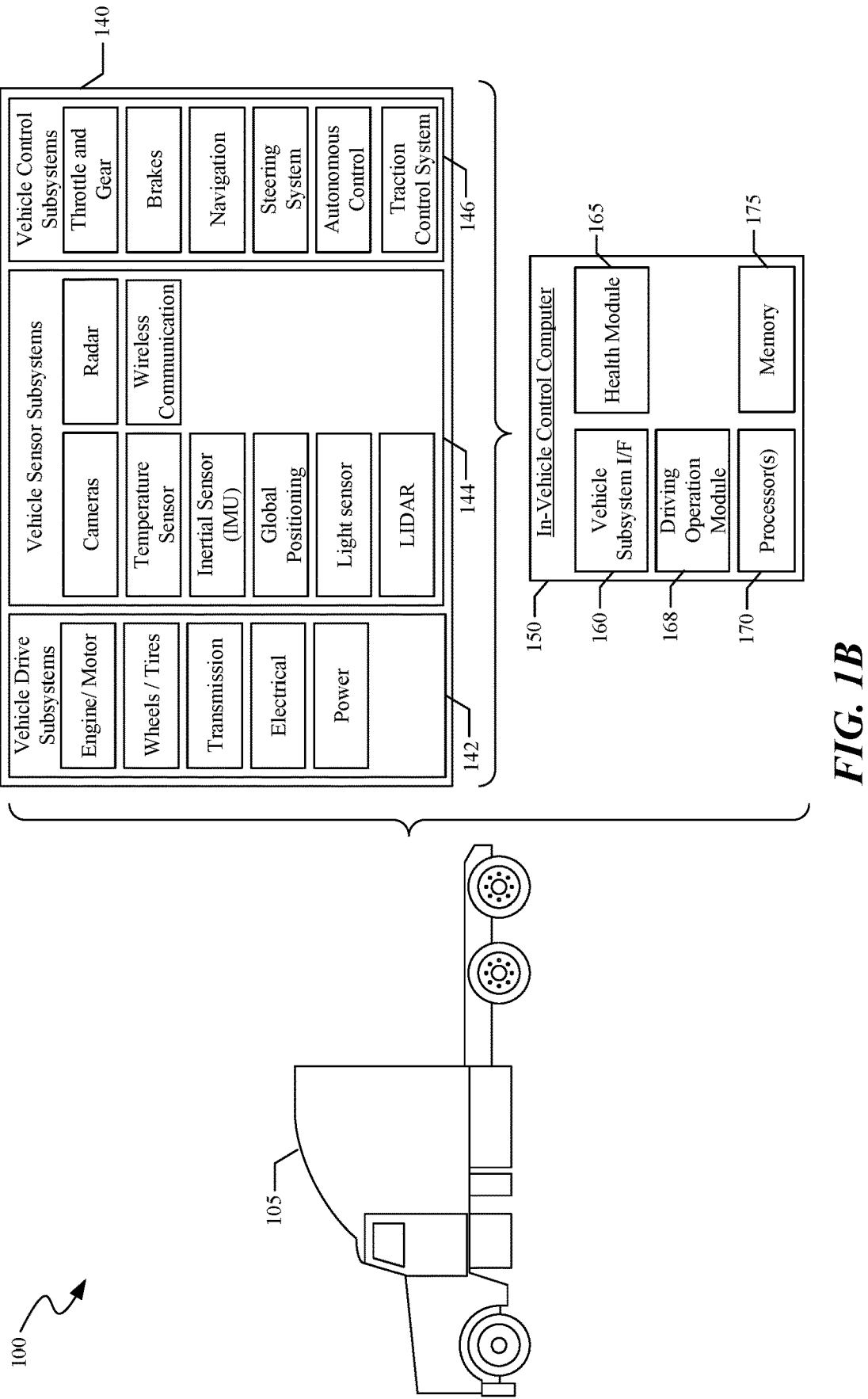
FIG. 1B shows a block diagram of an example vehicle ecosystem in which an in-vehicle control computer located in the vehicle can generate and send a data package to a health-check device.

FIG. 1B shows a block diagram of an example vehicle ecosystem 100 in which an in-vehicle control computer 150 located in the autonomous vehicle 105 can generate and send a data package to a health-check device. As shown in FIG. 1B, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The autonomous vehicle 105 may include various vehicle subsystems that support the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems. Alternatively, in some embodiments, one or more components or devices can be removed from the various subsystems. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an $O_2$ monitor, a fuel gauge, an engine oil temperature, etc.). In some embodiments, the vehicle sensor subsystem 144 may include sensors in addition to the sensors shown in FIG. 1B.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the health module 165 and the driving operation module 168 as explained in this patent document. For instance, the processor 170 executes the operations associated with health module 165 for performing a determining operation in which the autonomous vehicle 105 is determined to be within a pre-determined distance of a location of a health-check device, and for generating and sending a data package to the health-check device in response to the determining operation. The operations of the health module 165 are further described in this patent document. The processor 170 executes the operations associated with driving operation module 168 for determining driving related operations of the autonomous vehicle 105 based on a message received from the health-check device.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

FIG. 2 shows a flow diagram for a digital inspection of health of an autonomous vehicle between a first computer 250 that may be located in an autonomous vehicle and a second computer 254 that may be located in a stationary location (e.g., in a building next to a road). An autonomous vehicle comprises a first computer 250 that includes a first processor configured to perform operations 202, 204, and 212. At operation 202, the health module performs a first determination that a first location of the autonomous vehicle operating on a road is within a pre-determined distance of a second location a second computer 254 with which the first computer is configured to communicate, wherein the second computer is located in a stationary location. At operation 204 the health module transmits (e.g., wirelessly transmits), in response to the first determination, a data package comprising an health indicator that indicates an overall health of the autonomous vehicle.

The second computer 254 comprises a second processor configured to perform operations 206 to 210. At operation 206, a health check module on the second computer 254 (and associated with the second processor) receives the data package from the first computer. At operation 208, the health check module of the second computer 254 performs a second determination, based on the health indicator, that the autonomous vehicle is allowed to continue operating on the road. At operation 210, the health check module sends, to the first computer in response to the second determination, a message that indicates that the autonomous vehicle is allowed to continue operating on the road. At operation 212, the health module of the first computer receives the message and causes the autonomous vehicle to continue to be driven on the road in response to the message.

In this document the term "exemplary" is used to mean "an example of" and, unless otherwise stated, does not imply an ideal or a preferred embodiment. In the patent document the term "autonomous semi-trailer truck" or "semi-trailer truck" is used to describe features of the operations performed by the autonomous semi-trailer truck and a health-check device. However, the techniques described in this patent document can be applied to other kinds of vehicles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of performing an autonomous driving operation, comprising:

transmitting, by a transceiver associated with a first computer located in an autonomous vehicle, a data package to a second computer located outside the autonomous vehicle, wherein the data package is transmitted as the autonomous vehicle is driven on a road, and wherein the data package includes information that indicates that the autonomous vehicle is safe to operate on the road;

receiving, by the transceiver and from the second computer, a message that indicates the autonomous vehicle is allowed to continue operating on the road; and causing the autonomous vehicle to continue to be driven on the road in response to the message.

2. The method of claim 1, wherein the data package is transmitted upon determining that the autonomous vehicle is within a pre-determined distance of a location of the second computer.

3. The method of claim 2, wherein the pre-determined distance is set based on a reception range of a wireless transceiver associated with the second computer.

4. The method of claim 1, wherein the data package is transmitted without displaying a prompt to request whether to send the data package to the second computer.

5. The method of claim 1, wherein the first computer stores a database that includes information associated with a plurality of information categories, wherein the database includes a first set of information marked as identification information, wherein the database includes a second set of information marked as inspection information, and wherein the database includes a third set of information marked as confidential information, wherein the confidential information is stored in the database in the first computer.

6. The method of claim 5, wherein prior to the transmitting, the data package is allowed to include at least some data from the first set of information or the second set of information that are respectively marked as the identification information or the inspection information, and wherein the data package is disallowed from including data from the third set of information that is marked as confidential information.

7. The method of claim 1, wherein the data package comprises identification information that includes a vehicle identification number (VIN) of the autonomous vehicle, and a license plate number of the autonomous vehicle.

8. The method of claim 1, wherein the data package comprises identification information that includes a weight of the autonomous vehicle, and wherein the weight of the autonomous vehicle is determined using sensors located towards a rear portion of the autonomous vehicle where goods are located.

9. The method of claim 1, wherein the data package comprises inspection information that indicates a year and a calendar quarter when an inspection was last performed on the autonomous vehicle.

10. The method of claim 1, wherein the data package does not include confidential information that is stored in a database in the first computer.

11. The method of claim 10, wherein the confidential information includes information about a navigation route being taken from a starting address to a destination.

12. The method of claim 10, wherein the confidential information includes maintenance history of the autonomous vehicle.

13. The method of claim 10, wherein the confidential information includes content of goods being transported by the autonomous vehicle.

14. The method of claim 10, wherein the confidential information includes a log or history of speed data of the autonomous vehicle over time.

15. A first computer located in an autonomous vehicle for performing an autonomous driving operation, comprising:

a processor configured to:

transmit a data package to a second computer located outside the autonomous vehicle, wherein the data package is transmitted as the autonomous vehicle is driven on a road, and wherein the data package includes information that indicates that the autonomous vehicle is safe to operate on the road;

receive, from the second computer, a message that indicates the autonomous vehicle is allowed to continue operating on the road; and cause the autonomous vehicle to continue to be driven on the road in response to the message.

16. The first computer of claim 15, wherein the data package comprises identification information that includes a name of a carrier or an owner that operates the autonomous vehicle.

17. The first computer of claim 15, wherein the data package comprises identification information that includes a weight of the autonomous vehicle.

18. The first computer of claim 15, wherein the data package comprises inspection information that indicates a year and a calendar quarter when an inspection was last performed on the autonomous vehicle.

19. The first computer of claim 15, wherein the data package comprises identification information that includes a vehicle identification number (VIN) of the autonomous vehicle, and a license plate number of the autonomous vehicle.

20. The first computer of claim 15, wherein the data package comprises identification information that includes a weight of the autonomous vehicle, and wherein the weight of the autonomous vehicle is determined using sensors located towards a rear portion of the autonomous vehicle where goods are located.

* * * * *